United States Patent
Kassouni

(10) Patent No.: US 8,262,926 B2
(45) Date of Patent: Sep. 11, 2012

(54) METHOD OF MAKING CALCIUM CHLORIDE—AGGREGATE COMPOSITION

(76) Inventor: Van M. Kassouni, Grand Rapids, MI (US)

( * ) Notice: Subject to any disclaimer, the term of this patent is extended or adjusted under 35 U.S.C. 154(b) by 34 days.

(21) Appl. No.: 13/026,597

(22) Filed: Feb. 14, 2011

(65) Prior Publication Data

US 2012/0205575 A1    Aug. 16, 2012

(51) Int. Cl.
  *C09K 3/18* (2006.01)
(52) U.S. Cl. ............ 252/70; 106/13; 264/115; 264/123; 264/140
(58) Field of Classification Search .................. None
  See application file for complete search history.

(56) References Cited

U.S. PATENT DOCUMENTS

| | | | |
|---|---|---|---|
| 2,308,289 A | | 1/1943 | Lawrence |
| 3,433,863 A | * | 3/1969 | Bowden et al. ............... 264/140 |
| 3,501,320 A | | 3/1970 | Pietryka et al. |
| 4,247,331 A | | 1/1981 | Hamlin et al. |
| 4,588,512 A | | 5/1986 | Rippie |
| 4,676,918 A | | 6/1987 | Toth et al. |
| 5,211,869 A | * | 5/1993 | Steinhauser et al. ............ 252/70 |
| 5,296,167 A | * | 3/1994 | Murray ......................... 252/387 |
| 5,599,475 A | | 2/1997 | Ossian et al. |
| 5,645,755 A | | 7/1997 | Wiesenfeld et al. |
| 5,932,135 A | | 8/1999 | Janke et al. |
| 6,039,890 A | | 3/2000 | Ossian et al. |
| 6,183,664 B1 | | 2/2001 | Kim et al. |
| 2003/0146409 A1 | * | 8/2003 | Vickers et al. .................. 252/70 |

* cited by examiner

*Primary Examiner* — Mary F Theisen
(74) *Attorney, Agent, or Firm* — Gardner, Linn, Burkhart & Flory, LLP

(57) ABSTRACT

A method of forming a calcium chloride and aggregate composition includes providing a calcium chloride compound, adding an aggregate into the calcium chloride compound, and mixing the aggregate and calcium chloride compound to establish a mixed composition having the aggregate substantially uniformly suspended in the calcium chloride compound. The aggregate may comprise any suitable aggregate material, such as sand, salt or rock salt or the like. The aggregate may be mixed with the calcium chloride when the calcium chloride is in a paste form so as to substantially uniformly mix or blend the aggregate and calcium chloride and to substantially uniformly suspend the aggregate in the calcium chloride paste.

20 Claims, 2 Drawing Sheets

US 8,262,926 B2

METHOD OF MAKING CALCIUM CHLORIDE—AGGREGATE COMPOSITION

FIELD OF THE INVENTION

The present invention relates generally to tablets or pellets or flakes used for melting snow and ice and to a method of making such tablets or pellets or flakes.

BACKGROUND OF THE INVENTION

It is known to form tablets or pellets for use in melting snow and ice on a surface or roadway or walkway. Often, the tablets or pellets comprise calcium chloride and are formed of a desired size for the particular application, such as small pellets for spreading on a walkway or the like to melt the ice from the walkway. Such calcium chloride pellets or tablets or flakes are typically costly to manufacture due to the cost by volume of calcium chloride.

SUMMARY OF THE INVENTION

The present invention provides a method of making a calcium chloride and aggregate composition or paste that substantially uniformly suspends an aggregate material (such as sand or salt or rock salt or the like) in a calcium chloride paste or substance or compound. The aggregate is mixed into the calcium chloride substance while the calcium chloride is in a paste-like form and the calcium chloride-aggregate composition may be dried into a flake mixture or the like, and/or the aggregate may be mixed into the calcium chloride substance (such as in a paste-like form or flake or powder form or the like) and the mixture may be formed and pressed into calcium chloride-aggregate tablets or pellets or the like.

According to an aspect of the present invention, a method of forming a calcium chloride and aggregate composition includes providing a calcium chloride compound (such as a calcium chloride compound in a liquid or paste form), adding an aggregate into the calcium chloride compound, and mixing or blending the aggregate and calcium chloride compound to establish a mixed composition having the aggregate suspended in the calcium chloride compound.

The aggregate may comprise any suitable aggregate material, such as sand or salt or rock salt or the like. Optionally, the mixed composition may be pressed into a plurality of tablets or pellets, or the mixed composition may be dried and hardened and ground or processed or formed into a flake or powder form or the like.

Thus, the present invention provides a method of forming a calcium chloride and aggregate composition that results in the aggregate being substantially uniformly mixed with the calcium chloride so that the resultant flakes or paste or pellets or tablets comprise a uniform mixture of calcium chloride and aggregate materials. The aggregate materials are effectively suspended in the calcium chloride compound or liquid or paste to provide the desired substantially uniform mixture. The mixed composition thus may provide substantial cost reductions as compared to pure calcium chloride elements (i.e., calcium chloride elements without additives), because the introduction of an aggregate material introduces a lower cost material into the mixture to reduce the volume costs of the mixture or product. The introduction of an aggregate material, such as sand or salt or the like, may also enhance traction at the surface or walkway or roadway at which the mixture is used.

These and other objects, advantages, purposes and features of the present invention will become apparent upon review of the following specification in conjunction with the drawings.

DESCRIPTION OF THE PREFERRED EMBODIMENTS

Figure 1:
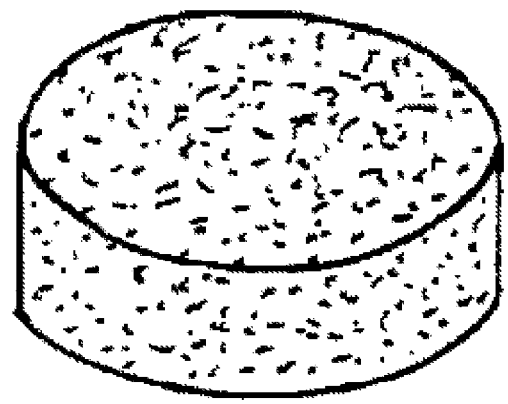
FIG. 1 is a perspective view of a pressed tablet comprising calcium chloride and aggregate in accordance with the present invention.

Referring now to the drawings and the illustrative embodiments depicted therein, a snow or ice melting tablet or pellet or composition or element comprises calcium chloride and an aggregate material (such as, for example, sand or rock salt or salt or other suitable aggregate). The aggregate and calcium chloride are mixed or blended together and may be pressed or formed into the desired shape and size tablet or pellet or element so that the resulting pressed or formed element comprises a substantially uniform composition that will not break apart into sand pieces and calcium chloride pieces, as discussed below. Thus, the calcium chloride element includes an aggregate material (such as, for example, sand or rock salt or the like), thereby reducing the volume amount of calcium chloride in an element or composition of a given volume or size (and thus reducing the cost of the tablets or pellets or elements or composition), while providing traction assistance as the sand breaks up on the walkway or surface at which the composition is spread or used, as also discussed below. The ice melting pellet or tablet or composition or element is thus formed from a composition or mixture of calcium chloride and aggregate that is blended or mixed in a manner that causes the aggregate to be suspended in the calcium chloride compound, whereby when the tablet or pellet is pressed or formed, the aggregate and calcium chloride are effectively bonded together in the desired shape or form. Optionally, the calcium chloride and aggregate mixture or composition may be dried or processed (such as by hardening and grinding) to provide a granular or flake like mixture for spreading on walkways or roadways or the like.

Typically, calcium chloride is provided in a powder form or a granular form or a flake form or a pellet form (such as small round pellets that are spread on a surface that is to be de-iced), and the calcium chloride elements may be screened or filtered to separate or sort the elements to different sizes, such as for different applications. Optionally, calcium chloride can also be acquired as a "chloride milk" or "lime milk", such as by pumping water or acid into the ground (where limestone is present), whereby the water or acid dissolves or breaks up the lime or calcium oxide and comes up to the surface as a liquid composition or "milk", or such as by mixing hydrochloric acid with lime, whereby the acid dissolves the lime to become a liquid mixture or "milk". The liquid or milk may be filtered to remove unwanted solid materials and then the filtered liquid may be processed to achieve a paste-like calcium chloride compound. The filtered solid material or lime can be put back into the next liquid mixture and dissolved further. The liquid or milk, after passing through the filter, is then boiled off or otherwise processed to remove or reduce or evaporate some or all of the water from the liquid, so that only the previously dissolved calcium chloride compound remains. As the liquid or milk thickens (as the water is removed or evaporated), the calcium chloride compound or material becomes a paste-like substance, and may be dried, hardened and ground, or otherwise processed further, to transform the compound into a powder form or granular form or flake form or the like.

While the calcium chloride compound is in a paste form (or at any of the stages above), an aggregate material (such as any suitable aggregate, such as granular sand and/or salt, such as rock salt or the like) is added to the calcium chloride paste (such as during a drying stage of the paste) and mixed or blended into the paste in accordance with the present invention. Optionally, the aggregate may be mixed into the calcium chloride composition at any time in the process, preferably after the liquid composition is filtered to remove solid materials from the liquid or milk solution. The aggregate thus is substantially uniformly mixed or blended into the calcium chloride compound or paste and is effectively suspended in the paste to establish a calcium chloride-aggregate composition or paste-like substance.

As the calcium chloride-aggregate composition dries, it establishes a finished calcium chloride substance (with an aggregate substantially uniformly mixed therein and suspended therein), which may be transformed into a flake form, granular form, powder form or the like. For example, the calcium chloride-aggregate paste or composition may be dried or processed and made into flakes or powder that have a substantially uniform calcium chloride and aggregate mixture (at the desired or appropriate ratio as set during the paste mixing operation, such as about twenty percent aggregate or more or less depending on the particular application). Optionally, the calcium chloride-aggregate composition may be packaged and sold in a powder form or as flakes or grains or the like.

Optionally, the calcium chloride-aggregate composition (such as in the paste form or flake or granular form or the like) may be pressed or formed into tablets or pellets. For example, a calcium chloride-aggregate paste or composition (such as discussed above) may be formed and pressed into the desired size and shape tablets or pellets or the like. Optionally, a calcium chloride powder or flake material (such as may be acquired via known means) may be mixed or blended with an aggregate material (such as sand or rock salt or salt) and formed and pressed into the desired size and shape tablets or pellets or the like. For example, a mechanical press machine may press and form the calcium chloride-aggregate composition (such as in paste form or flake form or the like) into a plurality of pressed tablets or pellets of a desired form or forms (such as, for example, a disc-shaped tablets such as shown in FIG. 1 of desired size or such as small pellets of desired size, such as about ⅛ inch square pellets or the like), depending on the particular application of and use for the tablets or pellets.

The amount by volume of aggregate added to the calcium chloride compound or paste may vary depending on the particular application and desired cost. For example, the amount by volume of aggregate may comprise at least about ten percent of the total volume of the mixed composition, or the amount by volume of aggregate may comprise at least about twenty percent of the total volume of the mixed composition, or the amount by volume of aggregate may comprise at least about thirty percent of the total volume of the mixed composition, depending on the intended application of the finished product. For example, if greater traction and/or lower cost is desired, a greater amount of aggregate or sand may be mixed or blended into the calcium chloride paste or compound.

Figure 2:
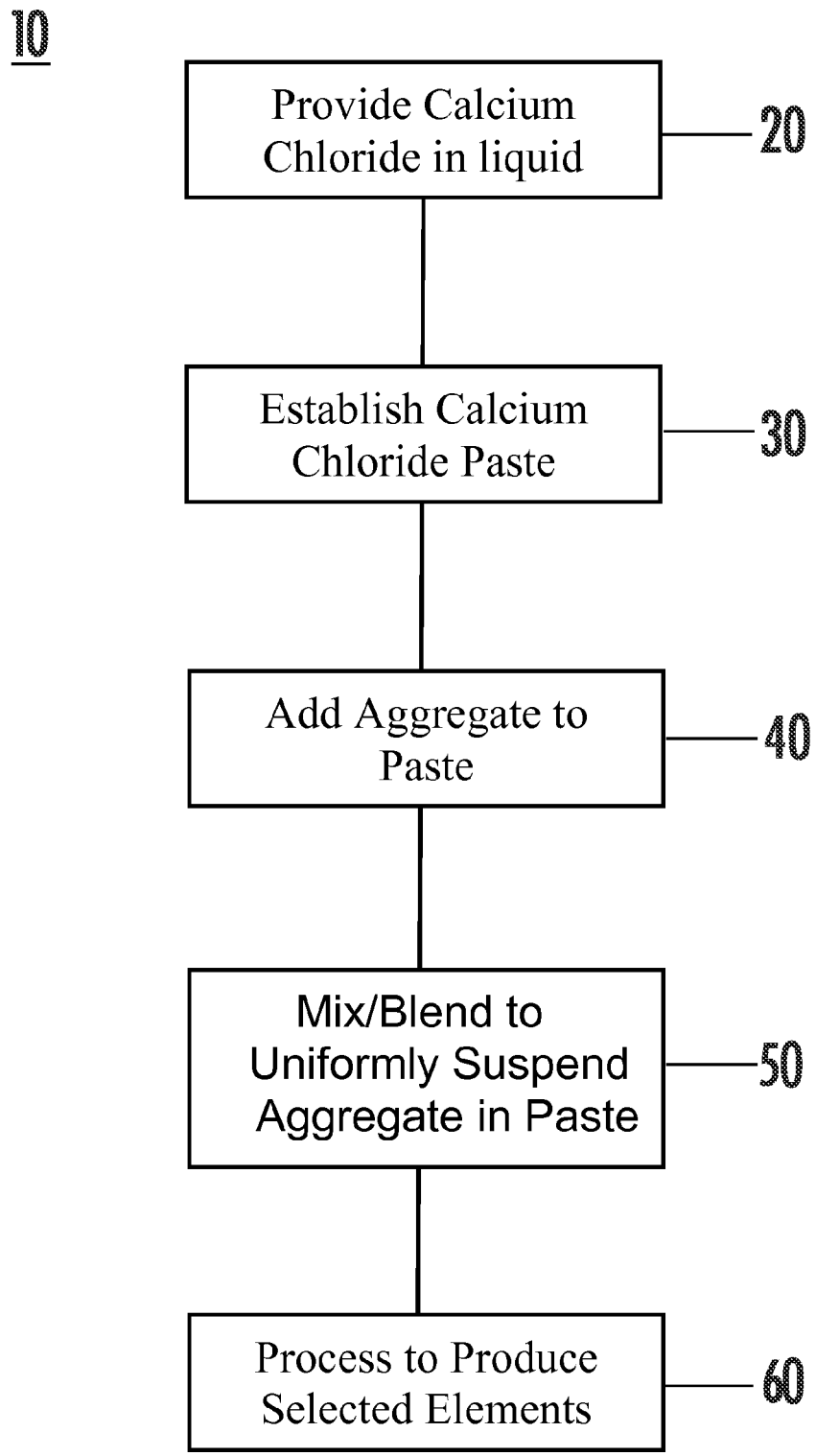
FIG. 2 is a flow chart of a method or process or producing calcium chloride-aggregate products or elements in accordance with the present invention.

The present invention thus provides a method of making a calcium chloride-aggregate element, such as a blended paste or flakes or powder or pressed or compressed elements or the like. For example, and with reference to FIG. 2, a method 10 of forming or making calcium chloride-aggregate elements comprises providing calcium chloride in a liquid form at 20 (such as providing the liquid solution having calcium chloride dissolved therein as described above). The liquid form is processed (such as by boiling to remove/reduce the water or liquid content of the composition) to establish a calcium chloride paste at 30. The aggregate (such as sand or salt or rock salt or the like) is added to the paste at 40 and the calcium chloride paste and aggregate material are mixed or blended at 50 to substantially uniformly mix and suspend the aggregate in the calcium chloride paste. The blended mixture or paste is then processed at 60 to produce the selected calcium chloride-aggregate product or elements (such as calcium chloride-aggregate tablets or pellets or such as calcium chloride-aggregate flakes or powder or grains or the like).

Thus, the present invention provides a method and system that provides a substantially uniform mixture or composition of calcium chloride and an aggregate (such as sand or rock salt or salt or the like). The addition of the aggregate to the calcium chloride compound provides enhanced traction for the user when the product is used to melt snow or ice on a surface, such as a roadway or walkway or the like. Also, the addition of the aggregate to the calcium chloride compound or paste may provide a significant cost reduction for a given quantity of calcium chloride flakes or powder or grains or tablets or pellets or the like (because the sand or other aggregate is added to the mixture and is substantially less costly than the calcium chloride compound). The aggregate is suspended in the calcium chloride compound or paste, and preferably is added during the blending phase or paste phase of the manufacturing of a suitable calcium chloride compound. Optionally, the aggregate may be suspended in the calcium chloride compound at a tableting or pressing stage, where a press or machine may mechanically combine the materials and press the combined material into tablets or pellets or the like.

Changes and modifications in the specifically described embodiments may be carried out without departing from the principles of the present invention, which is intended to be limited only by the scope of the appended claims as interpreted according to the principles of patent law.

The invention claimed is:

1. A method of forming a calcium chloride and aggregate composition, said method comprising:
   providing a calcium chloride compound comprising a liquid compound or a paste compound;
   adding an aggregate into the calcium chloride compound; and
   mixing the aggregate and calcium chloride compound to establish a mixed composition having the aggregate substantially uniformly suspended in the calcium chloride compound.

2. The method of claim 1, wherein adding an aggregate comprises adding sand into the calcium chloride compound.

3. The method of claim 1, wherein adding an aggregate comprises adding granular salt into the calcium chloride compound.

4. The method of claim 1, wherein adding an aggregate comprises adding rock salt into the calcium chloride compound.

5. The method of claim 1, further comprising pressing the mixed composition into a plurality of tablets or pellets.

6. The method of claim 1, further comprising drying and hardening the mixed composition and grinding the hardened composition into a flake or powder form.

7. The method of claim 1, wherein providing a calcium chloride compound comprises pumping water or acid into the ground and collecting the lime or chloride milk that comes to the surface of the ground and filtering the milk and processing the filtered liquid to reduce the water content of the filtered liquid.

8. The method of claim 1, wherein providing a calcium chloride compound comprises providing a calcium chloride paste, and wherein adding an aggregate comprises adding an aggregate into the calcium chloride paste to establish a calcium chloride-aggregate paste.

9. The method of claim 8, further comprising evaporating some of the water from the calcium chloride-aggregate paste.

10. The method of claim 9, further comprising hardening the calcium-aggregate paste and grinding the hardened composition to achieve a flake or granular form of the calcium chloride-aggregate composition.

11. The method of claim 8, wherein the calcium chloride-aggregate paste is pressed and formed into a plurality of tablets or pellets.

12. The method of claim 8, wherein adding an aggregate comprises adding an aggregate into the calcium chloride paste that is at least about 20 percent by volume of the mixed composition.

13. A method of forming a calcium chloride and aggregate composition, said method comprising:
   providing a calcium chloride paste;
   adding an aggregate into the calcium chloride paste;
   mixing the aggregate and calcium chloride paste to establish a mixed paste having the aggregate suspended in the calcium chloride paste; and
   wherein adding an aggregate comprises adding an aggregate into the calcium chloride paste that is at least about 10 percent by volume of the mixed paste.

14. The method of claim 13, wherein adding an aggregate comprises adding sand into the calcium chloride paste.

15. The method of claim 13, wherein adding an aggregate comprises adding granular salt into the calcium chloride paste.

16. The method of claim 13, wherein adding an aggregate comprises adding rock salt into the calcium chloride paste.

17. The method of claim 13, further comprising pressing the mixed paste into a plurality of tablets or pellets.

18. The method of claim 13, further comprising evaporating some of the water from the mixed paste.

19. The method of claim 18, further comprising hardening the mixed paste and processing the hardened mixed paste to achieve a flake or granular form of the mixed paste.

20. The method of claim 13, wherein adding an aggregate comprises adding an aggregate into the calcium chloride paste that is at least about 30 percent by volume of the mixed paste.

* * * * *